United States Patent [19]

White et al.

[11] Patent Number: 5,154,441
[45] Date of Patent: Oct. 13, 1992

[54] FOLDING AND ROLLING TWO SURFACE TABLE

[76] Inventors: Richard W. White, 3006 French Ave., Lake Worth, Fla. 33461; Robert J. White, 340½ Princeton Dr., Lake Worth, Fla. 33460

[21] Appl. No.: 826,795

[22] Filed: Jan. 28, 1992

[51] Int. Cl.$^5$ .............................................. B62B 1/12
[52] U.S. Cl. ..................... 280/645; 280/652; 280/47.19; 280/47.24; 280/47.33; 108/120; 211/200; D6/474; D34/21
[58] Field of Search ............... 280/30, 641, 643, 645, 280/652, 47.18, 47.19, 43.22, 43.24, 47.24, 47.33, 47.35; 108/93, 117, 120; 211/200; 248/169, 432, 439; D6/429, 430, 431, 474; D34/21, 24

[56] References Cited

U.S. PATENT DOCUMENTS

| | | | |
|---|---|---|---|
| 74,252 | 2/1868 | Stone | 211/200 |
| D. 299,796 | 2/1989 | White | D6/337 |
| 1,560,288 | 11/1925 | Morvay | 280/30 |
| 2,414,943 | 1/1947 | Gray | 280/641 |
| 2,624,469 | 1/1953 | Cadwell | 211/147 |
| 2,841,409 | 7/1958 | Osier | 248/432 |
| 2,927,702 | 3/1960 | Van Deusen | 211/149 |
| 3,147,748 | 9/1964 | Frank | 280/641 X |
| 3,913,935 | 10/1975 | McGillicuddy | 280/641 |
| 4,239,280 | 12/1980 | Ackerman | D6/429 X |
| 4,262,606 | 4/1981 | Hodson | 108/99 |

FOREIGN PATENT DOCUMENTS

| | | | |
|---|---|---|---|
| 1195851 | 11/1959 | France | 108/117 |
| 2168889 | 7/1986 | United Kingdom | 211/200 |

*Primary Examiner*—Charles A. Marmor
*Assistant Examiner*—Brian L. Johnson
*Attorney, Agent, or Firm*—Alvin S. Blum

[57] ABSTRACT

A two tier, rolling and folding table has a top planar platform (1) supported at one end by a U shaped first leg assembly (7) connected to the platform by fixed pivots and supported at another end by a pair of legs (11) of a second leg assembly connected to the platform by a sliding pivot bar (12) that slides in guide slots (13) and latches in an open position. The legs of first and second leg assemblies mutually and pivotally intersect intermediate their ends. A bottom planar platform (2) with handle is supported at one end by fixed pivot connections to the U shaped leg assembly, and at another end by fixed pivot connections to the parallel members (23) of a wheeled leg assembly (20) carrying a pair of wheels. The legs (11) connected to the sliding bar (12) pass freely through slots (26) in the bottom platform and pivotally connect to the vertical members (23) of the wheeled leg assembly to lock the wheels in an open position. When the latches (15) are disengaged, the top platform folds down upon the bottom platform and the legs (11) force the wheeled assembly forward to form a flat package that is easily wheeled about. The wheeled leg assembly is easily disengaged from the legs (11) to fold flat beneath the platform for a second, most compact, storage position.

5 Claims, 1 Drawing Sheet

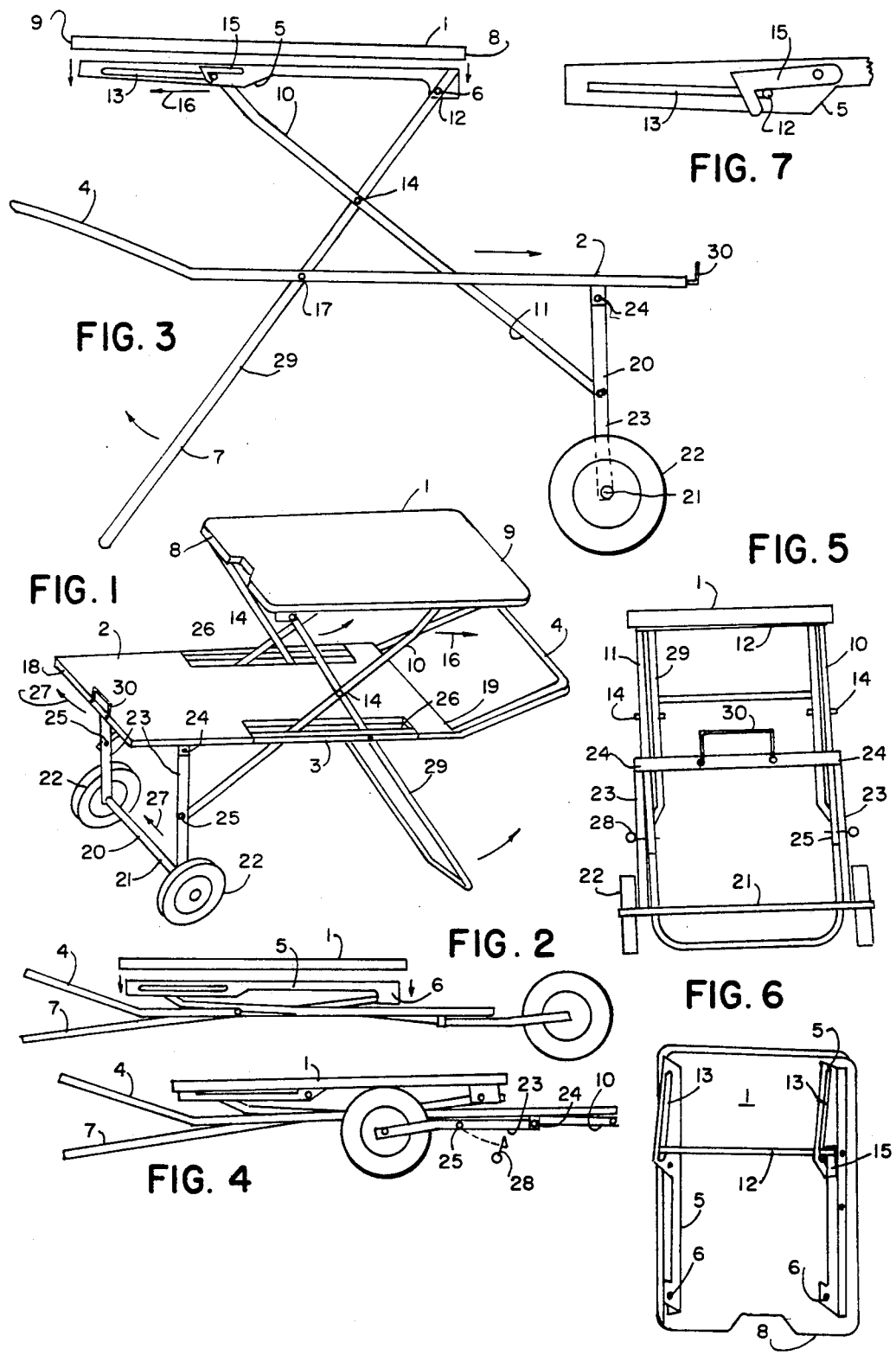

FOLDING AND ROLLING TWO SURFACE TABLE

BACKGROUND OF THE INVENTION

This invention relates to tables and carts and more specifically to a table having two surfaces, one above the other, and wheels at one end for rolling about, that folds flat for transport and storage.

U.S. Pat. No. 2,927,702 issued Mar. 8, 1960 to Van Deusen, and U.S. Pat. No. 4,262,606 issued Apr. 21, 1981 to Hodson teach multiple tier tables that fold and U.S. Pat. No. 2,624,469 issued Jan. 6, 1953 to Cadwell et al teaches a two level rolling table that adjusts to several levels. Design U.S. Pat. No. 299,796 issued Feb. 14, 1989 to White, one of the applicants, teaches a combined collapsible picnic table and carrier for a cooler. None of the prior art references teach the unique structure of the instant invention. They require multiple motions to convert from a fully open to a folded flat condition.

SUMMARY OF THE INVENTION

It is accordingly an object of the invention to provide a two level table with wheels at one end and a handle at a second end that may be tilted and rolled about. It is another object to provide the table with means to fold flat or open up in one single action. It is yet another object to provide the table with means for reducing the overall length of the flat folded configuration for enhanced transport and storage, so that the flat folded condition is provided with two operating conditions, a first condition with wheels extended for rolling about and a second condition with wheels retracted for a more compact package. It is yet another object to provide the table with a lower level support surface that extends beyond the upper level support surface for support of tall objects.

The two level table of the invention comprises an upper planar platform, supported at a first end by a first leg assembly that is U-shaped having the ends of the two arms connected to the upper planar platform by fixed pivots, and supported at a second end by a second leg assembly including two legs connected to the platform by a sliding pivot mechanism that slides in guides. The first and second leg assemblies mutually and pivotally intersect intermediate their ends. A lower planar platform is supported and connected at one end to the first leg assembly by fixed pivots connected to the two arms of the U. The lower platform is supported by, and connected to, a wheeled leg assembly, comprising two legs with wheels, by a pair of fixed pivots. The two legs of the second leg assembly pass freely through slots in the lower platform and pivotally connect at their ends to the two legs of the wheeled leg assembly at a point intermediate their ends.

A latching mechanism locks the sliding pivot mechanism in the open position. When unlatched, the sliding pivot mechanism enables the device to be folded flat with one platform against the other, and the wheeled leg assembly is folded forward of the lower platform by the forces transmitted by the second leg assembly as it folds. In this flat position, the device may be easily rolled about by a handle that extends from the lower platform. The wheeled leg assembly may be disconnected from the second leg assembly and folded under the lower platform for compact storage.

These and other objects, advantages and features of the invention will become more apparent when the detailed description is studied in connection with the drawings, in which:

BRIEF DESCRIPTION OF THE DRAWINGS

FIG. 1 is a perspective view of the rolling table of the invention in unfolded position.

FIG. 2 is a side elevation view of the table in rolling, folded position, with the top lifted off for illustrative purposes.

FIG. 3 is a side elevation view of the rolling table of the invention with the upper platform lifted off for illustrative purposes.

FIG. 4 is a side elevation view of the table in compact folded position.

FIG. 5 is a front end elevation view of the table in unfolded position.

FIG. 6 is a perspective view of the underside of the upper platform with legs removed.

FIG. 7 is a detail in side elevation of the latch on the sliding pivot.

DETAILED DESCRIPTION OF PREFERRED EMBODIMENT

Referring now first to FIGS. 1 and 6, the table of the invention comprises a molded fiberglass top platform 1 and a molded fiberglass bottom platform 2 supported on a rectangular metal frame 3 that is bent up where it extends beyond the platform to provide handle 4. Bolted to the underside of top platform 1 are a pair of metal angle brackets 5. Each bracket has one pivot connection 6 at one end for connection to an arm 29 of the U-shaped first leg assembly 7 for supporting one end 8 of the top platform 1. The other end 9 of the top platform is supported by second leg assembly 10 which comprises two elongate leg portions 11 joined at their upper end by connecting rod 12. Connecting rod 12 slides and pivots in guide slots 13 in brackets 5. The first and second leg assemblies mutually and pivotally intersect at pivot point 14. A latch 15 is pivotally attached to each bracket 5 so that when rod 12 is moved to the end of guide slot 13, the latch will lift and then fall over the rod by gravity to hold the rod in place with the legs in the open position. The latches must be manually lifted to release the rod 12 and allow the second leg assembly 10 to fold as the rod 12 moves to the other end of the guide slots 13 as indicated by arrow 16. The bottom platform 2 is pivotally connected to each of the legs 11 of the second leg assembly by fixed pivots 17 in the frame 3. This supports the rear end 19 of the bottom platform 2. The front end 18 of the bottom platform is supported by the wheeled leg assembly 20, that includes axle 21 supporting wheels 22. The axle is connected to parallel vertical members 23 which are pivotally connected at pivot 24 to frame 3 at the front end 18 of bottom platform 2. Each parallel member 23 is also pivotally connected at intermediate point 25 to the lower end of leg 11 of the second leg assembly to lock the wheeled leg assembly in open position. The two legs 11 pass freely through slots 26 in the bottom platform. As the legs 11 fold, pivot point 25 is pushed forward, causing the wheeled assembly to fold forward, indicated by arrows 27. The folded table then assumes the configuration shown in FIG. 2. In this configuration, the folded table is readily wheeled about. The pivot points 25 joining the parallel members 23 to the ends of legs 11 are formed by removable pins 28 such as ring-grip quick-release self-locking pins well known in the art that may be readily pulled out so that the wheeled support assembly 20 is free of leg portions 11. The wheeled support assembly 20 may then be folded back under the platforms as shown in FIG. 4 for a compact storage position.

The table is readily changed from the folded position of FIG. 2 to the open position of FIGS. 1 and 3 by one simple lifting up of the top platform. The pivoting latches 15 automatically lock the table in the open position as the rod 12 slides past them. When the latches are released, the table falls down to the folded position of FIG. 2 in one motion. A wire lip 30 extends above the front end 18 of the bottom platform. This prevents articles stored on the platform from sliding off when the open table is lifted by handle 4 and wheeled about.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

We claim:

1. A two-tier, wheeled, folding table having at least tow operating positions comprising:
   a) a substantially planar top platform that is substantially horizontal when the table is in an open position;
   b) a substantially planar bottom platform that is substantially horizontal when the table is in an open position;
   c) a handle attached to one end of said bottom platform;
   d) a U shaped first leg assembly having two arms for supporting a firs end of said top platform, said first leg assembly connected thereto by fixed pivots at the ends of said arms;
   e) a second leg assembly having a pair of legs for supporting a second end of said top platform, said second leg assembly connected to said top platform by sliding pivot connecting means, said sliding pivot connecting means including latching means for holding said table in open position;
   f) said arms of said first leg assembly mutually and pivotally intersecting said legs of said second leg assembly at a point intermediate the ends thereof;
   g) said arms of said first leg assembly supporting a first end of said bottom platform, said arms connected thereto by fixed pivot means at a point intermediate the ends of said arms;
   h) a wheeled leg assembly for supporting a second end of said bottom platform, said wheeled leg assembly having paired elongate members, each of said members connected at a first end to said second end of said bottom platform by fixed pivot means and said members supporting at least one wheel at a second end;
   i) connecting means for pivotally connecting the lower end of each leg of said second leg assembly to one of said elongate members of said wheeled leg assembly at a point intermediate opposite ends, whereby unlatching said latching means when said table is in said open position permits said second leg assembly to slide and pivot at the connection to said top platform and said first and second leg assemblies to fold until said top and bottom platforms are substantially juxtaposed and said wheeled leg assembly is folded flat with said at least one wheel extending beyond said bottom platform by the force of said second leg assembly connected thereto to form a flat folded, rollable position.

2. The table according to claim 1, in which said connecting means for pivotally connecting the lower end of each leg of said second leg assembly to said elongate member is removable to thereby provide for folding said wheeled leg assembly flat beneath said bottom platform to form a second, more compact folded position for storage.

3. A two level folding table that is rollable when tilted, and non-rollable when not tilted, comprising:
   a first, upper work surface;
   a second, lower work surface;
       said table having at least two modes of operation, a first, closed, folded flat mode in which said first and second work surfaces are juxtaposed and a second, open, unfolded mode in which said first and second work surfaces are spaced apart form one another and arranged substantially parallel to a support surface upon which the table rests;
   a handle means arranged at a first end of said table for tilting and rolling said table about;
   a wheel assembly having a vertical support and at least one wheel arranged at a second, opposite end of said table for wheeling said table about when tilted, said wheel assembly supporting said second end of said table in said second, open mode;
       a supporting leg assembly arranged for supporting said first end of said table in said second, open mode; and
       connecting means interconnecting said first and second work surfaces to said wheel assembly vertical support and said supporting leg assembly in such fashion that said table is foldable from said second, open mode to said first, folded mode by a single motion, wherein said wheel assembly is folded with said at least one wheel positioned beyond said second end of said table, and said table is unfoldable from said first, closed, folded flat mode to said second, open unfolded mode by a single motion.

4. The table according to claim 3, further comprising latch means connected to said table for automatically holding said table in said second, open, unfolded mode when said table is converted from said first to said second mode in said single motion, said latch means being manually releasable to cause said table to convert from said second to said first mode in a single, folding motion.

5. The table according to claim 4, in which a third mode of operation is provided whereby said wheel assembly is provided with folding means for folding said wheel assembly flat beneath said second, lower work surface to provide a compact folded condition for storage.

* * * * *